United States Patent
Gately et al.

(10) Patent No.: US 9,798,686 B2
(45) Date of Patent: Oct. 24, 2017

(54) SLAVE SIDE BUS ARBITRATION

(71) Applicant: Silicon Laboratories Inc., Austin, TX (US)

(72) Inventors: Matthew B. Gately, Austin, TX (US); Øivind Aleksander Grimsgaard Loe, Austin, TX (US)

(73) Assignee: SILICON LABORATORIES INC., Austin, TX (US)

( * ) Notice: Subject to any disclaimer, the term of this patent is extended or adjusted under 35 U.S.C. 154(b) by 317 days.

(21) Appl. No.: 14/547,917

(22) Filed: Nov. 19, 2014

(65) Prior Publication Data

US 2016/0140067 A1     May 19, 2016

(51) Int. Cl.
| | |
|---|---|
| *G06F 13/00* | (2006.01) |
| *G06F 13/10* | (2006.01) |
| *G06F 13/364* | (2006.01) |
| *G06F 13/42* | (2006.01) |
| *G06F 13/28* | (2006.01) |

(52) U.S. Cl.
CPC ............ *G06F 13/364* (2013.01); *G06F 13/28* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 4,888,802 | A * | 12/1989 | Cooney | G06Q 20/382 380/277 |
| 5,583,506 | A * | 12/1996 | Sinor | G01S 7/295 342/25 R |
| 5,758,127 | A * | 5/1998 | MacAulay | H04L 69/18 710/71 |
| 5,856,921 | A * | 1/1999 | Kim | H04L 12/403 700/3 |
| 2006/0236018 | A1* | 10/2006 | Dao | G06F 15/7867 710/317 |
| 2008/0256278 | A1* | 10/2008 | Thomas | G06F 13/364 710/117 |
| 2009/0235012 | A1* | 9/2009 | Rosner | G11C 7/10 711/103 |
| 2010/0318706 | A1* | 12/2010 | Kobayashi | G06F 13/364 710/114 |

* cited by examiner

*Primary Examiner* — Hyun Nam
(74) *Attorney, Agent, or Firm* — Trop, Pruner & Hu, P.C.

(57) ABSTRACT

A method includes, in response to a master port requesting bus access for a bus transfer with a slave port, selecting the master port to allow a master device that is coupled to the master port to perform a bus transfer with a slave device that is coupled to the slave port. The bus transfer is associated with at least one bus cycle. The method includes, in response to an end of the bus transfer, maintaining selection of the master port for at least one additional bus cycle.

23 Claims, 3 Drawing Sheets

SLAVE SIDE BUS ARBITRATION

BACKGROUND

A computer system may include interconnection fabric, or a bus, for purposes of communicating data between initiating bus devices called "masters" (processor cores and direct memory access (DMA) engines, for example) and target bus devices, or "slaves" (memory devices, for example). In a typical bus operation, a master initiates a bus transfer (such as a bus transfer to read or write data) with a given slave by driving appropriate address signals onto the bus to target the slave, along with the appropriate control signals and data signals (if data is being written to the slave). The slave that is the target of the bus transfer responds by generating the appropriate signals onto the bus for such purposes as transferring data to the master; receiving data from the master; indicating an error; or signaling the master to retry the bus transfer.

The bus is a limited system resource, which typically couples a single master to a single slave at any one time. Therefore, when multiple masters concurrently contend for access to the same slave, the system typically time-multiplexes bus transfers by these masters with the slave by applying an arbitration policy.

SUMMARY

In an example embodiment, a method includes, in response to a master port requesting bus access for a bus transfer with a slave port, selecting the master port to allow a master device that is coupled to the master port to perform a bus transfer with a slave device that is coupled to the slave port. The bus transfer is associated with at least one bus cycle. The method includes, in response to an end of the bus transfer, maintaining selection of the master port for at least one additional bus cycle.

In another example embodiment, an apparatus includes a plurality of master ports, which include a given master port; a plurality of slave ports; a bus layer that is associated with the given master port; a demultiplexer and a slave side arbiter device. The demultiplexer has a bus layer input that is coupled to the bus layer and a plurality of bus layer outputs. Each bus layer output is associated with a different slave port of the plurality of slave ports. The slave side arbiter device is associated with a given slave port of the plurality of slave ports to, in response to granting of a request associated with the given master port to perform a bus transfer with the given slave port, causes the given slave port to be coupled to the bus layer output of the demultiplexer associated with the given slave port and maintain coupling of the given slave port to the bus layer output associated with the given slave port for at least one bus cycle after the bus transfer.

In yet another example embodiment, an apparatus includes an integrated circuit that includes a bus interconnect matrix. The bus interconnect matrix includes a plurality of master ports, a plurality of slave ports, bus connection fabric and an arbiter. The arbiter selects a given master port of the plurality of master ports. The given master port is coupled to a master device, and the given master requests bus access for a bus transfer with a given slave port of the plurality of slave ports. The bus transfer is associated with at least one bus cycle. The arbiter maintains selection of the given master port for at least one additional bus cycle after an end of the bus transfer.

Advantages and other desired features will become apparent from the following drawings, description and claims.

DETAILED DESCRIPTION

An electronic system may include various master devices, such as processing cores, direct memory access (DMA) engines, and so forth, which perform bus transfers with various slave devices (volatile memory devices, non-volatile memory devices, other peripheral devices, and so forth) of the system for purposes to storing and retrieving data and instructions. Slave side bus arbitration-based techniques and systems are disclosed herein for purposes of enhancing system performance for such bus transfers.

Figure 1:
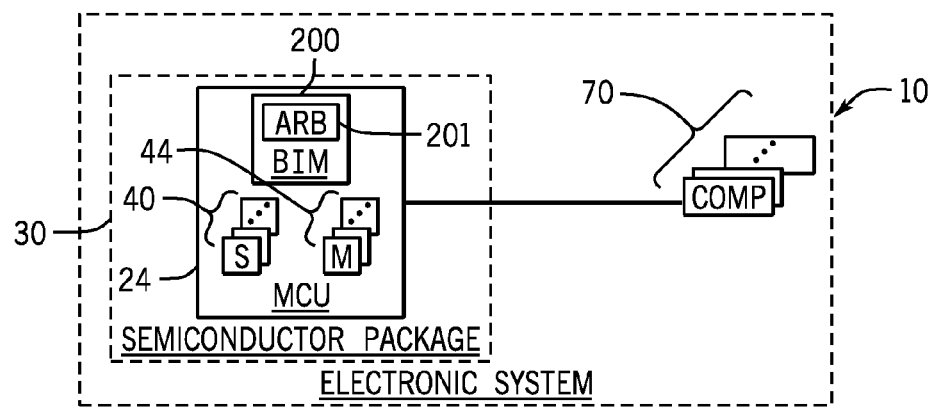
FIG. 1 is a schematic diagram of an electronic system according to an example embodiment.

Referring to FIG. 1, an electronic system 10 may include a microcontroller unit (MCU) 24 and various components 70 that are controlled by the MCU 24. As examples, the components 70 may include one of more of the following depending on the particular application: an electrical motor, a household appliance, an inventory control terminal, a computer, a tablet, a smart power meter, a wireless interface, a cellular interface, an interactive touch screen user interface and so forth. All or part of the components of the MCU 24 may be part of an integrated circuit (IC), or semiconductor package 30. For example, all or part of the components of the MCU 24 may be fabricated on a single die or on multiple dies (a multi-chip module, for example) of the semiconductor package 30.

As discussed in further detail below, the MCU 24 includes a bus interconnect matrix (BIM) 200, which contains bus fabric for performing bus transfers (read and write operations, for example) between bus master devices 44 (a processing core, a DMA engine, and so forth) and bus slave devices (volatile memory devices, non-volatile memory devices, peripheral devices, and so forth) of the MCU 24. The BIM 200 may be an Advanced High-speed Bus (AHB), in accordance with example embodiments. As described further herein, a slave side arbiter 201 of the BIM 200 regulates bus interconnections between the master 44 and slave 40 devices in a manner that limits slave device idle time.

Figure 2:
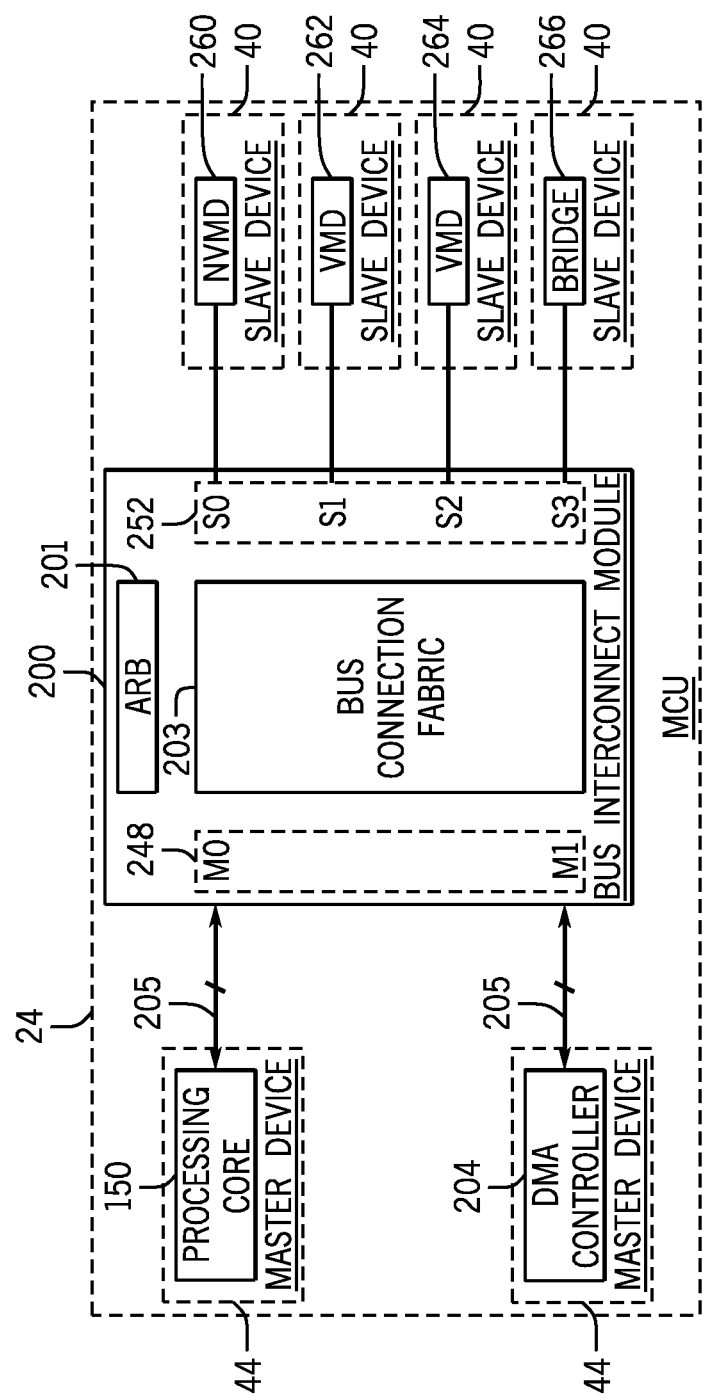
FIG. 2 is a schematic diagram of a microcontroller unit (MCU) according to an example embodiment.

Referring to FIG. 2, in accordance with an example embodiment, the MCU 24 includes such master devices 44, as a processing core 150 and a DMA engine 204. As an example, in some embodiments, the processing core 150 may be a 32-bit core, such as the Advanced RISC Machine (ARM) processing core, which executes a Reduced Instruction Set Computer (RISC) instruction set. In further example embodiments, the processor core 150 may be a more powerful core or a less powerful core, such as an 8-bit core (an 8051 core, for example). In general, the processing core 150 and DMA engine 204 communicate with such slave devices 40 of the MCU 24, as one or more non-volatile memory devices 260 (Flash memory devices, for example), and volatile memory devices 262 and 264 (static random access memory (SRAM) memory devices, for example).

It is noted that the MCU 24 may contain master devices and slave devices other than the ones depicted in FIG. 2, in accordance with further example embodiments. For example, the slave devices may include components other than memory storage components, such as, as examples, a math accelerator; components that receive analog signals, such as analog-to-digital converters (ADCs) or comparators; components that are external to the MCU 24; and digital components, such as, as examples, a Universal Serial Bus (USB) interface, a universal asynchronous receiver/transmitter (UART), a system management bus (SMB) interface, a serial peripheral (SPI) interface, and so forth. Moreover, as depicted in FIG. 2, the slave devices 44 may include such additional devices as a bridge 266. For example, in accordance with some embodiments, the bridge 266 may couple the BIM 200 to a lower speed Advanced Peripheral Bus (APB) (not shown), which is coupled to peripheral devices (not shown) that operate at relatively slower speeds, as compared to the slaves 40.

The BIM 200 may be an integrated circuit (fabricated on a single die or on multiple dies, for example); and in further embodiments, the BIM 200 may be a set of integrated circuits. Depending on the particular embodiment, the BIM 200 may be entirely formed from hardware components or may be formed from a combination of hardware and software.

For the example embodiment of FIG. 2, the BIM 200 contains master ports 248 (specific master ports $M_0$ and $M_1$ being depicted in FIG. 2) that are coupled to the processing core 150 and the DMA engine 204. In this manner, each master device 44 communicates address, control and data signals of an associated layer 205 with a corresponding master port 248. In FIG. 2, the processor core 150 is shown as being coupled to the $M_0$ master port 248. A given master device 44 may be assigned multiple master ports 248. In such a case, each bus port of the master device 44 may be coupled to individual master ports 248. The master ports of a given master device 44 may also be multiplexed and then coupled to one or more of the master ports 248, in accordance with further example embodiments.

The BIM 200 further contains slave ports 252 (specific slave ports $S_0$, $S_1$, $S_2$ and $S_3$ being depicted in FIG. 2), which are selectively coupled to address, control and data signals of the slave devices 401; and the BIM 200 further contains bus connection fabric 203, which represents the bus communication paths and circuitry that couple the master 248 and slave 252 ports together to allow bus transfers to occur.

More specifically, a given master device 44, such as the processing core 150, may assert (drive high, for example) a bus request signal (part of an address and control bus phase of a bus transfer) to request access to the bus connection fabric 203 for a bus transfer with a given slave device 40, and the master device 44 may also provide (as part of the address and control phase) a corresponding address that identifies a particular slave port 252 that is the target of the requested bus transfer. In accordance with example embodiments, the particular slave port 252 that is the target of a given request may be identified by decoded higher order address bits, as represented by address signals that are furnished by the master device 44.

In addition to providing the address and requesting bus access during the address and control phase, a master device 44 may also provide control signals, which indicate the particular transfer (read operation, write operation, and so forth), the width of the transfer, whether the transfer is a burst operation, and so forth. In addition to the address and control phase, the bus transfer includes a data phase, which spans one or more bus cycles for purposes of transferring data from a master device 44 to a slave device 40, or vice versa.

Multiple master devices 44 may attempt to concurrently access the same slave port 252. For example, the processing core 150 and the DMA controller 204 may concurrently contend for bus access to the same slave port 252 for purposes of reading/writing data to/from a memory device that is coupled to the targeted slave port 252. To arbitrate such concurrent requests (i.e., to decide which master device 44 of several master devices 44 contending for access is granted access to the slave port 252), the BIM 200 includes a slave side arbiter 201, which may be distributed among the slave ports 252, as further described herein.

In accordance with example embodiments, the arbiter 201 applies an arbitration policy, such as a time-multiplexed arbitration policy (an arbitration policy generally based on round robin-based arbitration, priority-based arbitration or a policy that takes into account a combination of fairness and priority, as examples) among multiple master devices 44 that are requesting the same slave port 252 for purposes of selecting which master device 44 may access the slave port 252. Due to the ability of the BIM 200 to form multiple, concurrent master-slave connections, concurrent, or parallel, accesses are allowed between pairs of masters and slaves, in accordance with example embodiments.

Figure 3:
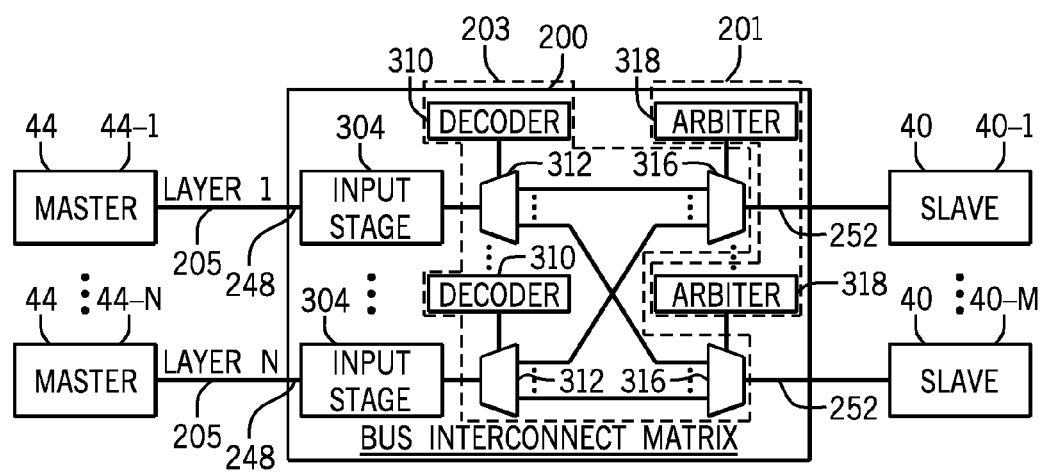
FIG. 3 is a schematic diagram of a bus interconnect matrix of the MCU of FIG. 2 according to an example embodiment.

Referring to FIG. 3, in accordance with example embodiments, the arbiter 201 arbitrates and controls connections between N master devices (master devices 44-1, 44-2 . . . 44-N, being depicted as examples in FIG. 3) and M slave devices 40 (slave devices 40-1, 40-2 . . . 40-M, being depicted as examples in FIG. 3). As depicted in FIG. 3, the arbiter 201 may be distributed among the slave ports 252 as slave slide arbiter devices 318, as each slave port 252 may have an associated slave side arbiter device 318 that controls bus connections for the associated slave port 252.

For a given master device 44 to request access for a bus transfer with a given slave port 252, the master device 44 asserts its associated bus request signal on a communication line of the associated layer 205 and also provides the address signals to the layer 205. As depicted in FIG. 3, each master port 248 of the BIM 200 has an associated input stage 304. A decoder 310 that is coupled to the input stage 304 and is associated with the master port 248 decodes the upper address bits of the provided address for purposes of identifying the particular slave port 252 that is targeted by the master device 44. The decoder 310 provides the appropriate signal(s) to a demultiplexer 312 to couple the layer 205 associated with the master device 44 to a multiplexer 316 that is associated with the targeted slave port 252. In this manner, the demultiplexer 312 has an input layer 205 and multiple output layers, where each output layer is associated with a different slave port 252.

In accordance with example embodiments, multiple master devices 44 may be concurrently contending for access to the same slave port 252. In other words, several master devices 44 may assert their associated bus request signals at the same and be targeting the same slave port 252. For example, master devices 44-1 and 44-N of FIG. 3 may, at a given time, both be asserting (driving high, for example) their bus request signals, which causes the layer 205 for each master device 44-1, 44-N to be coupled to different inputs of the multiplexer 316 for the same slave port 252.

In accordance with example embodiments, each multiplexer 316 is controlled by an associated slave side arbiter device 318, and for the scenario in which multiple master devices 44 are contending for access to the same slave port 252, the arbiter device 318 applies a time-multiplexed-based arbitration policy to select one of the associated master ports 248 and thus, decide which layer 205 is coupled to the port 252.

In accordance with example embodiments, when a particular slave device 40 is not being accessed by any master device 44, the slave device 40 may conserve power by entering an idle state in which the device 44 gates (tri-states, for example) at least some of its output signals and/or otherwise reduces circuit activity of the device 44. Correspondingly, the associated slave side arbiter device 318 may be constructed to introduce a wait state (one bus cycle, for example) before reengaging a new master device 44 to allow the slave device 40 to exit the idle state. For the case in which a given master device 44 is communicating back and forth between different slave devices 40 (and slave ports 252) in a connected series of data transfers, a number of such wait state delays may accumulate while the transfer occurs.

For example, in accordance with example embodiments, a given master device 44 may perform a series of data transfers between a volatile memory device (one slave device 40 coupled to one slave port 252) and an SPI peripheral device (another slave device 40 coupled to another slave port 252) through several rounds of "ping ponging" bus transfers in which, for each round, the master device 44 uses a bus transfer to read data from the volatile memory device and uses another bus transfer to write the read data to the SPI peripheral device.

In accordance with example embodiments disclosed herein, the slave side arbiter device 318 prevents its associated slave device 40 from entering an idle state for such a connected series of data transfers by applying the following arbitration rule: selection of a previously-selected master port 248 is maintained for an additional one or multiple bus cycles. Thus, the slave port 252 remains coupled to the demultiplexer 312 associated with the selected master port 248.

Figure 4:
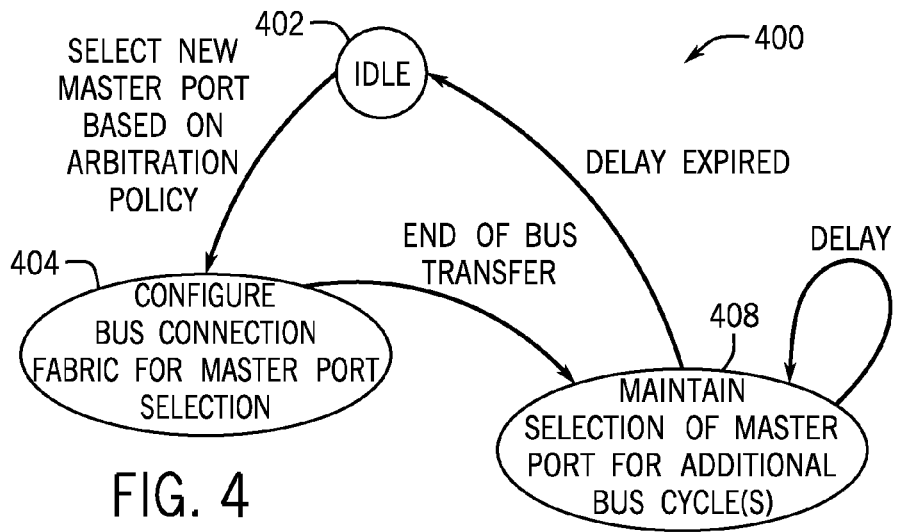
FIG. 4 is state diagram illustrating a slave side arbitration technique according to an example embodiment.

FIG. 4 depicts a state diagram 400 used by the slave side arbiter device 318, in accordance with example embodiments. Referring to FIG. 4, in accordance with example embodiments, the slave side arbiter device 318, when no master port 248 is selected, remains in an idle state 402. The arbiter device exits the idle state 402 in response to one or more master ports 248 requesting a bus transfer with the associated slave port 252. In response to the arbiter device 318 selecting a new master port 248 based on an arbitration policy, the arbiter device 318 transitions from the idle state 402 to a state 404. In state 404, the arbiter device 318 asserts the grant line associated with the selected master port 248 and configures the bus connection fabric for the selected master port 248, i.e., the arbiter device 318 causes the associated multiplexer 316 (FIG. 3) to couple its slave port 252 to the appropriate demultiplexer 312. At the end of the bus transfer, as depicted in FIG. 4, the arbiter device 318 transitions from the state 404 to a state 408 in which the arbiter 318 maintains selection of the previously selected master ported device for one or multiple additional bus cycles. In other words, the slave port 252 remains coupled to the demultiplexer 312 for the selected master port 248, even if the associated master 44 is no longer requesting the slave port 252. During the maintaining of the selection, the arbiter device 318 keeps the grant line associated with the master port 248 asserted.

In accordance with example embodiments, the arbiter device 318 may remain in the state 408 for a delay such as four to twelve bus cycles, although other delays may be imposed, in accordance with further example embodiments. It is noted that while the master port 248 remains selected, the associated master device 44 may perform a bus transfer with another slave port 252, as the selection of a given master port 248 by one slave side arbiter device 318 does not preclude another slave side arbiter device 318 from selecting the same given master port 248. At the end of the delay imposed in the state 408, the arbiter 318 transitions from the state 408 back to the idle state 402.

In accordance with example embodiments, the arbiter device 318 may include a counter (a three bit counter, for example), which the arbiter device 318 uses to measure the delay. For example, the counter may be clocked by a signal that cycles once per bus cycle for purposes of measuring a given number of bus cycles (eight bus cycles, for example), before indicating expiration of the delay by the overflowing or resetting of the counter, for example. The arbiter device 318 may measure the delay using other circuits/techniques, in accordance with further example embodiments.

Thus, due to the intermediary state 408 between states 404 and 402, time otherwise consumed in deselecting and reselecting a given master port is avoided, thereby inhibiting slave device idle time for certain connected data transfers and potentially increasing the efficiency of data transfers within the MCU 24. Maintaining selection of the master port for up to N additional bus cycles may have specific advantages, in accordance with example embodiments, such as increasing system performance while incurring a minimal current consumption increase.

Figure 5:
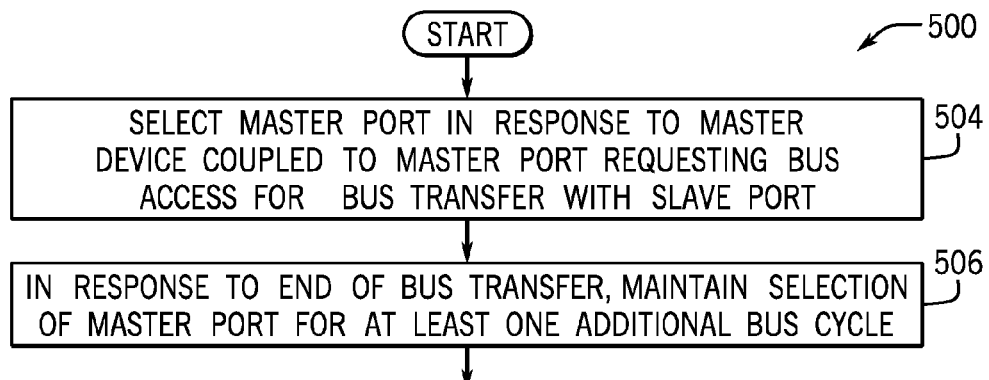
FIG. 5 is a flow diagram depicting a technique to regulate a slave device idle time according to an example embodiment.

Referring to FIG. 5, thus, in accordance with example embodiments, a technique 500 includes selecting (block 504) a master port in response to the master device that is coupled to the master port requesting bus access for a bus transfer with a slave port. Pursuant to the technique 500, in response to the end of the bus transfer, the technique 500 includes maintaining selection of the master port for at least one additional bus cycle.

Figure 6:
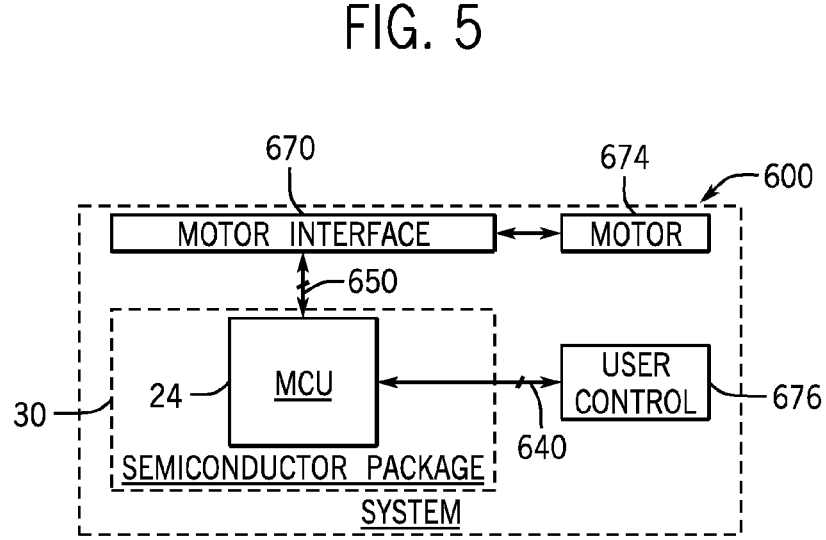
FIG. 6 is a schematic diagram of a motor control system according to an example embodiment.

Referring to FIG. 6, the MCU 24 may be used in numerous different applications. As an example, FIG. 6 depicts a motor control application in which an MCU 24 of a motor control system 600 generates/receives input and output signals (I/O signals) for purposes of controlling a motor 674. In this manner, the MCU 24 may generate signals at its I/O terminals 650 for purposes of communicating with a motor interface 670 (an interface containing drivers, sensors, and so forth); and in connection with this communication, the I/O terminals 650 may communicate waveforms with the motor interface (pulse width modulation (PWM) signals, for example), receive sensed currents and voltages, communicate data via one or more serial buses, and so forth. I/O terminals 640 of the MCU 24 may generate/receive signals to communicate with a user control interface 676 of the system 400 for such purposes as communicating status of the motor 674 or motor interface 670, communicating detected fault conditions, receiving user-directed commands and signals, and so forth.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
    in response to a master port requesting bus access for a bus transfer with a slave port, selecting the master port to grant a master device coupled to the master port permission to perform a bus transfer with a slave device coupled to the slave port such that the master device performs the bus transfer in response to the selection, the bus transfer occurring over at least one bus cycle; and
    in response to an end of the bus transfer, maintaining selection of the master port for at least one additional bus cycle.

2. The method of claim 1, wherein the bus transfer comprises an address phase and a data phase.

3. The method of claim 1, wherein the selecting the master port and the maintaining selection of the master port comprises using a slave side arbiter device.

4. The method of claim 3, further comprising, while selection of the master port is maintained:
    using another slave side arbiter device to select the master port, the selection of the master port by the other slave side arbiter device and using the master device to perform a bus transfer with another slave device coupled to another slave port.

5. The method of claim 1, wherein maintaining selection of the master port comprises maintaining assertion of a bus grant signal asserted before the end of the bus transfer.

6. The method of claim 1, further comprises coupling address, control and data lines of the slave port to a bus demultiplexer for the master port in response to the selecting of the master port and maintaining the selection of the master port.

7. The method of claim 1, wherein maintaining selection of the master port comprises maintaining selection of the master port for four to twelve bus cycles.

8. The method of claim 1, further comprising introducing a wait state in response to an end of the maintaining.

9. The method of claim 1, wherein the master port comprises a given master port of a plurality of master ports having concurrently asserted requests to access the slave port, the method further comprises selecting the given master port from the plurality of master ports based at least in part on an arbitration policy.

10. An apparatus comprising:
    a plurality of master ports comprising a given master port;
    a plurality of slave ports;
    a bus layer coupled to the given master port;
    a demultiplexer having a bus layer input coupled to the bus layer and a plurality of bus layer outputs, each bus layer output being coupled to a different slave port of the plurality of slave ports; and
    a slave side arbiter device coupled to a given slave port of the plurality of slave ports to, in response to granting of a request provided by the given master port to perform a bus transfer with the given slave port:
        cause the given slave port to be coupled to the bus layer output of the demultiplexer coupled to the given slave port; and
        maintain coupling of the given slave port to the bus layer output coupled to the given slave port for at least one bus cycle after the bus transfer.

11. The apparatus of claim 10, further comprising: a multiplexer controlled by the arbiter device to couple the given slave port to the bus layer output coupled to the given slave port.

12. The apparatus of claim 10, further comprising a decoder to decode an address provided by a master coupled to the master port to selectively couple the bus layer input to one of the bus layer outputs of the demultiplexer based on the address.

13. The apparatus of claim 10, wherein the arbiter device is further adapted to cause the given slave port to be decoupled from the bus layer output coupled to the given slave port and incur a delay of at least one bus cycle before granting another request.

14. The apparatus of claim 10, further comprising at least one additional arbiter device coupled to at least one other slave port of the plurality of slave ports.

15. An apparatus comprising:
    an integrated circuit comprising a bus interconnect matrix, wherein the bus interconnect matrix comprises:
        a plurality of master ports;
        a plurality of slave ports;
        bus connection fabric; and
        an arbiter to:
            select a given master port of the plurality of master ports, the given master port being coupled to a master device and the given master port requesting bus access for a bus transfer with a given slave port of the plurality of slave ports, wherein the bus transfer occurs over at least one bus cycle; and
            maintain selection of the given master port for at least one additional bus cycle after an end of the bus transfer.

16. The apparatus of claim 15, wherein the arbiter comprises a distributed slave side arbiter.

17. The apparatus of claim 15, wherein the arbiter is adapted to:
    while maintaining selection of the given master port, select the master port for another bus transfer between the master port and another slave port of the plurality of slave ports.

18. The apparatus of claim 15, wherein the arbiter is adapted to maintain selection of the given master port for four to twelve bus cycles.

19. The apparatus of claim 15, wherein the arbiter is adapted to select the given master port based on an arbitration policy.

20. The apparatus of claim 15, wherein the master device comprises a direct memory access (DMA) engine or a processor core.

21. The method of claim 1, further comprising the master device performing a bus transfer with another slave device during the at least one additional bus cycle.

22. The apparatus of claim 10, wherein the given master port to perform another bus transfer with a slave port of the plurality of slave ports other than the given slave port during the at least one bus cycle.

23. The apparatus of claim 15, wherein the given master port to participate in an additional bus transfer with a slave port of the plurality of slave ports other than the given slave port during the at least one additional bus cycle.

* * * * *